United States Patent [19]
Lewis et al.

[11] 3,714,143

[45] Jan. 30, 1973

[54] CONTINUOUS PROCESS FOR MANUFACTURE OF NITROCELLULOSE

[75] Inventors: Charles W. Lewis, Morristown; Everette O. Hann, Dover, both of N.J.

[73] Assignee: The United States of America as represented by the Secretary of the Army

[22] Filed: April 13, 1971

[21] Appl. No.: 133,648

[52] U.S. Cl. ............................. 260/220, 23/102 M
[51] Int. Cl. ................................. C08b 5/02
[58] Field of Search ............. 260/220; 149/96, 100

[56] References Cited

UNITED STATES PATENTS

| | | | |
|---|---|---|---|
| 2,403,493 | 7/1946 | Bouchard et al. | 260/220 |
| 2,771,418 | 11/1956 | Zeegers | 23/102 A |
| 2,776,965 | 1/1957 | Bennett et al. | 260/220 |
| 2,776,966 | 1/1957 | McMillan et al. | 260/220 |

FOREIGN PATENTS OR APPLICATIONS

| | | | |
|---|---|---|---|
| 563,545 | 9/1958 | Canada | 260/220 |

*Primary Examiner*—Donald E. Czaja
*Assistant Examiner*—Ronald W. Griffin
*Attorney*—Harry M. Saragovitz, Edward J. Kelly, Herbert Berl and A. V. Erkkila

[57] ABSTRACT

Continuous, pollution-free process for manufacture of nitrocellulose involves passing cellulose and nitric acid-magnesium nitrate nitrating agent through an attrition mill, separating the spent nitrating agent from the nitrocellulose, purifying the latter by countercurrent water wash, treating the wash liquors with an ion-exchange system to recover the magnesium and nitrate values therefrom, and recycling the latter and spent nitrating agent to the system. The invention provides an efficient, closed system which generates no waste products to pollute the environment.

7 Claims, 1 Drawing Figure

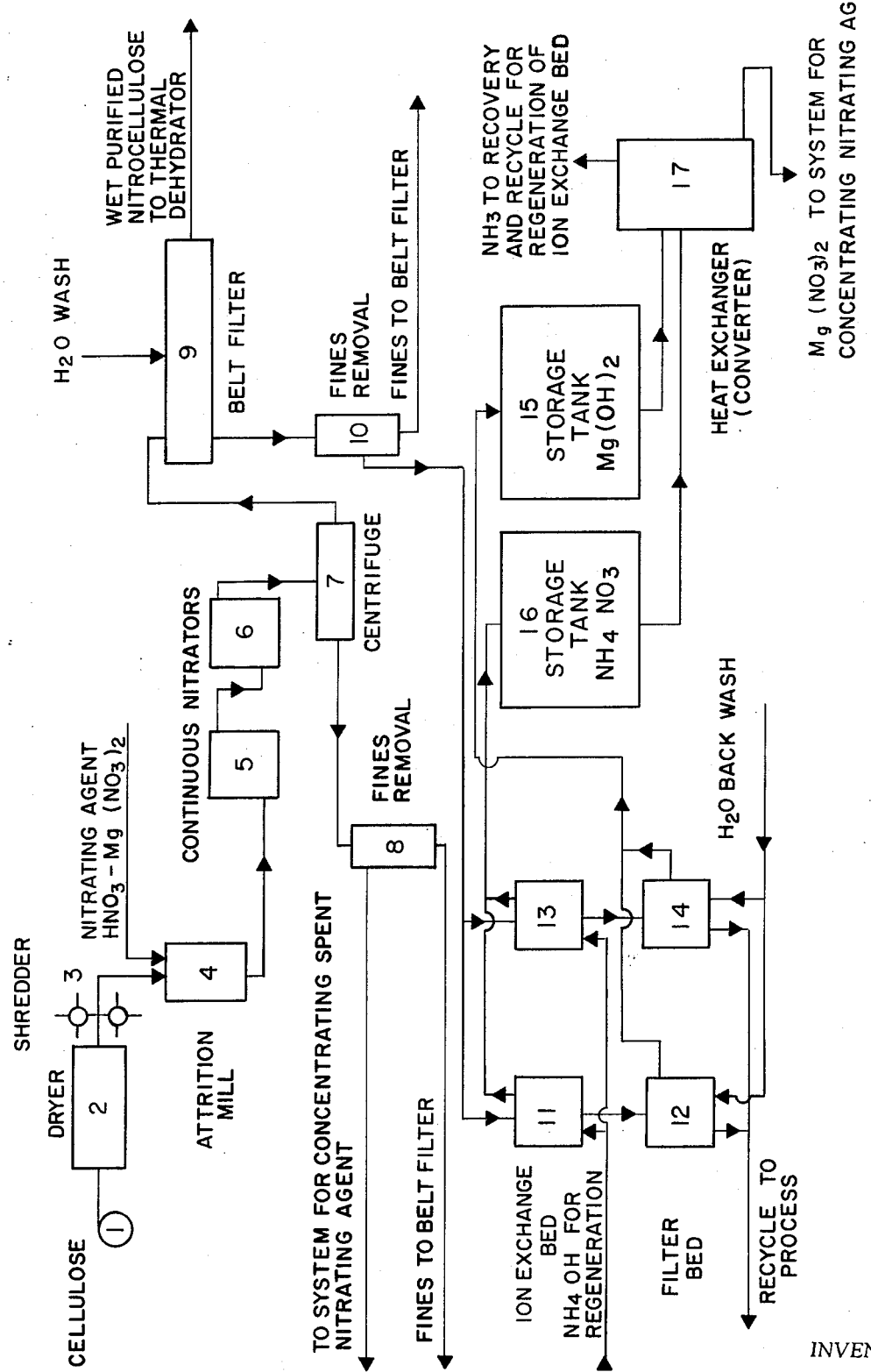

CONTINUOUS PROCESS FOR MANUFACTURE OF NITROCELLULOSE

The invention described herein may be manufactured, used and licensed by or for the Government for governmental purposes without the payment to us of any royalties thereon.

This invention relates to an improved continuous, pollution-free process for the manufacture and purification of nitrocellulose, wherein cellulose is nitrated with a nitrating medium containing nitric acid and magnesium nitrate. It also relates to a novel method for recovering nitric acid and magnesium nitrate from aqueous liquors containing same.

The conventional commercial process for manufacturing nitrocellulose comprises nitrating cellulose with "mixed acid", i.e. a mixture of nitric and sulfuric acids. This produces large amounts of sulfates, nitrates and fines as waste products and pollutants. Further, the nitrocellulose product must be subjected to lengthy and costly purification treatments to remove sulfuric acid and sulfate ester contaminants retained in the nitrocellulose.

It has been proposed to effect the nitration of cellulose with a nitrating agent comprising essentially nitric acid, magnesium nitrate and water. Thus, as stated in U.S. Pat. No. 2,776,966, this nitrating agent provides a number of advantages over the mixed acid process, e.g. it penetrates and wets even dense aggregates of cellulose particles more rapidly and uniformly, provides a more rapid nitration reaction and a more uniform nitrocellulose product, and eliminates the need for long and tedious treatments to purify and stabilize the nitrocellulose produced. The patent discloses a continuous process for preparing nitrocellulose, wherein a sheet of cellulose is continuously passed through a nitrating bath of said type and thereafter subjected to countercurrent washing with water in a series of zones to remove nitric acid and magnesium nitrate retained in the nitrocellulose. The spent nitrating agent and wash liquors are concentrated in a distillation apparatus and recycled to the nitrating bath along with fresh nitric acid and magnesium nitrate to replace that lost from the system so as to keep the system in balance. The washed nitrocellulose sheet is then passed into a disintegration bath vessel where it must be reduced to a particulate form for further purification, dehydration, etc. About 85 percent of the nitric acid and magnesium nitrate values retained in the spent acid remaining in the nitrocellulose is removed by countercurrent washing, and about 15 percent of such nitric acid and magnesium nitrate values are left in the nitrocellulose sheet after washing. Due to the physical state of the nitrocellulose thus obtained this latter amount is difficult to eliminate, and its removal requires relatively tedious and costly treatments, e.g. comminution of the nitrocellulose sheet followed by extensive extractions with aqueous alkalis and water. Thus it is lost from the system and must be replaced.

An object of this invention is to provide an improved continuous process for nitrating cellulose with nitric acid-magnesium nitrate nitrating agent, which produces a more rapid and uniform reaction and a nitrocellulose product which can be more readily and more completely purified by washing.

Another object is to provide a continuous process of said type wherein the nitric acid and magnesium nitrate values are essentially completely and economically recovered for reuse and a virtually pollution-free system is obtained.

A further object is to provide a novel method for recovering nitric acid and magnesium nitrate values from aqueous liquors containing same.

Other objects and advantages of this invention will appear or be obvious from the description of the invention set forth below.

In general, these objects are accomplished according to this invention by a continuous process, which comprises 1. feeding dry cellulose, e.g. cotton or wood pulp, and a nitrating medium of nitric acid and magnesium nitrate into an attrition type mill, wherein the cellulose is reduced to more or less controlled size particles, freshly exposed surfaces of cellulose are brought into immediate and intimate contact with the nitrating medium and nitration of the cellulose is initiated;

2. completing the reaction to the desired degree of nitration in the attrition mill or other suitable continuous flow nitrator;

3. separating the spent nitration medium from the nitrocellulose in a centrifuge, vacuum filter or other suitable means and concentrating it for reuse in the system;

4. purifying the nitrocellulose by washing it with water on a belt or other suitable filter to remove retained nitric acid and magnesium nitrate impurities;

5. contacting the wash liquors containing nitric acid and magnesium nitrate with an ion exchange medium which removes the nitrate and magnesium ions from said liquors;

6. recovering the magnesium and nitrate ions as magnesium nitrate and recycling the magnesium nitrate thus obtained to the system.

A preferred method of processing the wash liquors containing nitric acid and magnesium nitrate (step 5 above) comprises a. contacting the liquors with a basic, nitrate ion selective ion exchange resin capable of being regenerated with ammonium hydroxide, whereby the nitrate ions are absorbed and magnesium hydroxide is formed, b. contacting the ion exchange resin with aqueous ammonia to form ammonium nitrate and regenerate the resin, c. heating a mixture of the aqueous ammonium nitrate and magnesium hydroxide thus obtained to form magnesium nitrate and gaseous ammonia, d. recovering the ammonia and magnesium nitrate and recycling same to the system.

The following description together with the accompanying schematic drawing illustrate a preferred embodiment of the process of the invention.

As shown in the drawing, a continuous sheet of fibrous cellulose from roll 1 or loose linters is passed into a dryer 2 and thence to a shredder 3 which reduces the cellulose sheet to a suitable size for use in the nitration, e.g. pieces not exceeding about three-fourths inch in largest dimension. The cellulose pieces from the shredder and nitrating agent, preheated or precooled as desired, consisting of nitric acid, magnesium nitrate and water, are fed into an attrition mill 4. The attrition mill contains one or more rotating circular plates (discs) in close proximity to one or more stationary companion plates. The milling surfaces of the plates are grooved, serrated or otherwise formed to provide various degrees of milling action. The rotating discs are mounted on a drive shaft and can be adjusted to provide various clearances with the companion stator plates. A clearance of 0.002 to 0.02 inch is satisfactory. Instead of a mill with rotor and stator disc plates, other attrition mills can be employed, which by means of a solid surface moving at high speed and in close proximity relative to another solid surface of any suitable shape, (e.g. a cone, cylinder, dished plate, etc.) provides a rubbing and abrasive action on cellulose particles in the liquid nitration mass passing between such surfaces.

In the attrition mill the reaction mixture in the form of a thin slurry flows between the stator and high speed rotor plates, whereby the cellulose pieces are reduced to fine particles of a more or less controlled size, freshly exposed surfaces of the cellulose are brought into immediate and intimate contact with the nitrating agent, nitration of the cellulose is initiated and water of reaction is immediately removed to the main body of nitrating agent. Ratios of nitric acid to magnesium nitrate and water in the nitrating agent, as well as ratios of nitrating agent to cellulose, reaction temperatures, etc. which are suitable, are well known in the art, as disclosed in U.S. Pat. No. 2,776,966. The reaction mixture leaving the mill may be recycled, passed through another attrition mill or conducted to one or more conventional continuous flow nitrators 5 and 6, as required, to complete the reaction to the desired degree of nitration of the cellulose.

The nitration mass then flows to a continuous centrifuge 7, wherein the nitrocellulose is separated from the spent nitrating agent. The spent nitrating agent discharged from the centrifuge flows through a liquid cyclone separator 8 for removal of fines, and thence to a system (not shown) for concentrating nitric acid and magnesium nitrate by distillation. If desired, the nitrocellulose in the peripheral or discharge zones of the centrifuge can be washed e.g. sprayed with a limited amount of water to remove a portion of the adhering spent nitrating agent. The resulting wash liquors can be conducted through separator 8 to the concentration system, or through separator 10 to ion exchange bed 11. Since washing increases the dilution and cost of concentrating the spent acid by distillation, the concentration and method of processing such wash liquors will be determined by an economic balance between (a) concentration by distillation and (b) recovery by ion exchange. The nitrocellulose cake continuously discharged from the centrifuge can be slurried in water and pumped or dumped directly onto a continuous moving belt filter 9 for purification by countercurrent washing with water. The belt passes through a number of successive separate wash zones. Fresh water is sprayed through nozzles onto the nitrocellulose cake in the last zone and drawn through the cake by means of a slight vacuum. The wash liquor from the last zone is then pumped through another set of nozzles onto the cake in the penultimate zone and the filtrate from that zone is pumped onto the cake in the next preceding zone, and so on until the first zone. In this manner the concentration of magnesium nitrate and nitric acid in the wash liquor increases in each succeeding zone in opposite direction to the movement of the belt and is greatest in the first zone. Wash liquor from the aforesaid first zone flows through liquid cyclone separator 10 to ion exchange bed 11. Nitrocellulose fines recovered in separators 8 and 10 are returned to the continuous belt filter prior to its entry into said first zone. The purified nitrocellulose leaving the last wash zone is forwarded to a conventional thermal dehydrator (not shown).

An important advantage provided by nitration in an attrition mill employed in this invention is that the nitrocellulose product is produced in a soft, fluffy physical form, which can be readily purified by washing with a medium of water. Thus, adhering nitric acid and magnesium nitrate can be essentially completely removed by washing with less than 1 pound of water per pound of nitrocellulose produced. This makes commercially feasible the recovery of the magnesium and nitrate values from the wash liquors by means of certain ion exchange systems described below.

When the nitrocellulose product possesses a nitrogen content substantially greater than 12 percent by weight, it is advantageous to apply a neutralization wash with aqueous ammonia after most of the nitric acid and magnesium nitrate have been washed out with water and then follow with a final water wash. The use of aqueous ammonia (or ammonium carbonate) to wash the nitrocellulose product is uniquely compatible with the ion exchange system for recovering nitric acid and magnesium nitrate from wash liquors, as described below.

The wash liquors from the liquid cyclone separator 10 are conducted to an anionic ion exchange resin bed 11 packed with coarse particles of a nitrate ion selective ion exchange resin capable of being regenerated with ammonia. During continuous operation the wash liquors usually contain about 10 to 20 parts $HNO_3$ and about 100 to 200 parts $Mg(NO_3)_2$ per million, although much higher concentrations are present for a short time at start of operations. Suitable ion exchange resins are strongly basic synthetic resins in free hydroxide base form, such as a quaternary ammonium hydroxide type resin based on a styrene-divinylbenzene copolymer. Commercially available anionic ion exchange media of this type include those marketed as Amberlite$^R$ Ion Exchange Resins IRA 47 and IRA 68 by Rohm and Haas Co. Nitrate ions are thus completely removed from the liquors and the magnesium hydroxide formed thereby as a suspension of fine particles in the liquor readily passes through the bed of relatively coarse resin particles and is separated in a fine sand or other suitable filter 12. The effluent from filter 12 is essentially deionized, pollution-free water, which can be sewered or recycled to continuous belt filter 9 for washing nitrocellulose pulp. When aqueous ammonium hydroxide or carbonate is also used for washing nitrocellulose, the effluent from filter 12 contains ammonium hydroxide and is advantageously recycled to the system, e.g. for washing nitrocellulose.

When the capacity of ion-exchange bed 11 is reached (when effluent contains nitrate ions) the flow of wash liquor from separator 10 is directed to a duplicate resin bed 13 and filter 14. Filter 12 is then backwashed with a minimum of water to recover the magnesium hydroxide as a fine aqueous suspension, which flows via a by-pass of bed 11 (not shown) to storage tank 15. The ion exchange resin bed 11 is backwashed with aqueous ammonia to regenerate the resin and remove the displaced nitrate ions as a solution of ammonium nitrate, which flows to storage tank 16. Aqueous ammonium hydroxide solutions of about 4 to 12 percent, concentration, such as are recovered in the system described below, can be employed for backwashing the resin. The ammonium hydroxide stripping solution can be recycled through the bed if desired to increase the concentration of ammonium nitrate in the effluent forwarded to the storage tank. When regeneration is complete, the flow of wash liquor from separator 10 can be returned to ion exchange bed 11. Duplicate bed 13 is deionized and regenerated in similar manner.

Ammonium nitrate solution from storage tank 16 and magnesium hydroxide suspension from storage tank 15 are continuously fed into a heat exchanger 17, which may comprise one or more vertical agitated vessels provided with heating coils, bottom inlet ports for introducing liquid reactants, overflow outlet near the top for liquid effluent, nd an outlet at the top for conducting ammonia and water vapors to a water absorber or condenser for producing ammonium hydroxide (not shown). The concentration of the ammonium nitrate solution is generally about 4 to 12 percent by weight, since the ammonium hydroxide solution used for regenerating the resin bed is usually of similar concentration. The magnesium hydroxide slurry is also of similar concentration. The aqueous ammonium nitrate and magnesium hydroxide are introduced in essentially a 2:1 molar ratio into the heat exchanger, wherein they are mixed and maintained at or near the boiling point under ordinary pressure, e.g. about 100°C., and react to form ammonia and magnesium nitrate according to the following equation:

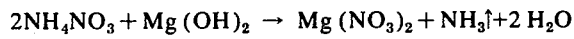

$$2NH_4NO_3 + Mg(OH)_2 \rightarrow Mg(NO_3)_2 + NH_3\uparrow + 2H_2O$$

Since some free nitric acid is extracted from the nitrocellulose, a slight excess of ammonium nitrate is usually present. Also, the reaction mixture is usually at most only slightly acid, since the ammonium nitrate liquor contains some free ammonia resulting from the regeneration of the ion-exchanged bed with ammonium hydroxide. Since the system generates a somewhat larger ratio of ammonium nitrate than is required for the aforesaid reaction, additional amounts of magnesium hydroxide from an outside source may be fed to the storage tank to maintain the required ratio thereof.

The ammonium hydroxide solution thus recovered together with additional fresh ammonium hydroxide, as required in the system, is recycled for use in regenerating the ion exchange bed and/or in washing the nitrocellulose pulp. The magnesium nitrate solution exiting from heat exchanger 17 may be concentrated separately or sent along with spent nitrating agent separated from nitrocellulose pulp, to a system for concentrating nitric acid-magnesium nitrate nitrating medium (not shown). Suitable systems for concentrating nitric acid by distillation with magnesium nitrate are well-known, as illustrated in aforesaid U.S. Pat. No. 2,776,966. Such systems, as ordinarily operated, produce practically no waste effluents and hence create essentially no pollution problems. The spent nitric acid-magnesium nitrate mixture thus concentrated and recovered can be mixed with (1) fresh concentrated nitric acid to replace that consumed in the nitration and (2) fresh magnesium nitrate, if necessary, to replace small amounts lost in the system, and returned to the system for nitrating cellulose.

Other ion-exchange systems can be employed for recovering the nitrate and magnesium values from aqueous liquors obtained in the present process. For example, the liquors can be passed through a three column system as follows:

The first column contains a bed of anionic ion exchange resin composed of quaternary ammonium resin in hydroxide form, which has been converted from the free hydroxide base form to the bicarbonate form by washing with aqueous carbonic acid solution. This bed removes the nitrate ions and converts the liberated magnesium ions to soluble magnesium bicarbonate. The effluent from the first column containing magnesium bicarbonate flows through a second column packed with a cationic ion exchange resin in free acid form, which removes the magnesium ions by ion-exchange. An illustrative, commercially available cationic ion exchange resin suitable for this purpose is marketed as Amberlite IRC 84 by Rohm and Haas Co. The effluent from the second column, consisting essentially of aqueous carbonic acid solution free from nitrate and magnesium ions, is passed through a third column packed with the aforesaid quaternary ammonium ion exchange resin in hydroxide form. The resin is thereby converted to the bicarbonate form. The effluent from this column is completely deionized water, which can be recycled to the system for washing the nitrocellulose product, or sewered.

When the resin in the first column is exhausted, as shown by the presence of nitrate ions in the effluent therefrom, the liquid flow is shifted to the third column, which functions in the same manner as the first column. Thereafter, the bed in the first column is washed with a stream of aqueous ammonium hydroxide solution, which removes the nitrate ions therefrom by formation of ammonium nitrate and converts the resin to the hydroxide form. When the bed in the first column has been completely divested of nitrate ions in this manner, it is converted to the bicarbonate form by introducing the effluent from the second column consisting essentially of aqueous carbonic acid solution free from nitrate and magnesium ions.

When the resin in the second column is exhausted, as indicated by the presence of magnesium ions in the effluent therefrom, the liquid flow is transferred to a standby column containing a bed of identical cationic resin. The resin in the second column is then washed with a stream of dilute nitric acid, e.g. 5-10% strength, which removes the magnesium ions as magnesium nitrate and converts the resin to the original free acid form. When the magnesium ions have been completely removed in this manner, the column can be placed on stream again. The standby column is processed in identical manner.

The magnesium nitrate solution thus obtained which may also contain free nitric acid is recycled to the system for concentrating and fortifying the nitration medium. The amount of ammonium nitrate formed and recovered the aforesaid system is relatively small. Thus, in nitration of cellulose according to the process of this invention, not more than about 1 pound of ammonium nitrate per 1,000 pounds of nitrocellulose product are generally formed. Such small amounts can be disposed of as fertilizer.

It is advantageous to integrate and operate all steps of the novel process in an overall continuous process, as described above. However, it is possible to operate some steps discontinuously, if desired, e.g. the concentration and fortification of the spent nitrating medium, the recovery of the magnesium and nitrate values in the ion exchange system, etc.

The following example illustrates the process of the invention:

Dry cellulose sheet in ¾ inch squares (from southern pine base pulp) and nitrating medium, consisting of 64.6 percent nitric acid, 19.47 percent magnesium nitrate and 15.93 percent water, were continuously fed into a laboratory attrition mill (Bauer Bros. Co. No. 148–1–BE) consisting essentially of a stainless steel, vertically rotating circular plate in close proximity to a companion stationary circular plate. The plates were 8 in. in diameter, possessed radial grooves and were contained in a stainless steel housing. The feed entered the mill through the center hole of the stationary plate and centrifugal force carried the feed into the milling section of the plates and the nitrocellulose pulp to the mill cavity surrounding the plates for discharge at the bottom of the cavity. The effluent from the mill was recirculated a second time. The reaction conditions were as follows:

| | |
|---|---|
| Ratio nitrating medium/cellulose | 50/1 |
| Reaction temperature | 40°C. |
| Time through mill, each pass | 100 sec. |
| Mill plate clearance | 0.003–0.005 in. |
| Mill plate speed | 3510 rpm |

The reaction mixture flowed from the mill to an agitated tank, wherein its average sojurn period was sufficient to complete the reaction to the desired degree of nitration (overall nitration cycle about 6 minutes), and thence to a continuous centrifuge, which separated the nitrocellulose from the spent nitrating medium. The nitrocellulose was transferred to a continuous belt filter and washed counter-currently with hot (85°C) water until acid-free and dried. The wash liquors were processed in the ion-exchange system and manner described above in relation to the drawing 1 to recover their contents of nitric acid and magnesium nitrate as magnesium nitrate. The recovered magnesium nitrate and recovered spent nitrating agent were concentrated and fortified in conventional manner and recycled to the process.

The nitrocellulose thus obtained contained 11.9 percent nitrogen. The chemical and physical characteristics of the nitro-cellulose thus obtained were equivalent to those of nitrocellulose produced by conventional nitration with mixed acid (nitric-sulfuric acid mixtures) and were superior to those of nitrocellulose obtained by batch nitration of shredded cellulose sheet with nitric acid-magnesium nitrate mixture.

From the foregoing description it can be seen that the invention provides a number of advantages over the prior art. Thus:

1. It eliminates the conventional use of mixed acid as the nitrating agent together with the lengthy purification treatments and pollution problems attending its use, and produces a nitrocellulose product of at least equal quality.

2. It provides a continuous process for the manufacture and purification of nitrocellulose, which is safe and economical; it also provides an essentially completely closed system, which generates no waste products to pollute the environment. The spent nitrating agent consisting of nitric acid and magnesium nitrate is concentrated, fortified and returned to the system. Nitrocellulose fines are collected and returned to the system. Nitric acid and magnesium nitrate washed from the nitrocellulose product are recovered as magnesium nitrate and returned to the system.

3. It provides an improved continuous method for nitrating cellulose with nitric acid-magnesium nitrate nitrating agent, which comprises passing the cellulose material and nitrating agent through an attrition type mill, wherein the cellulose is reduced to fine particles in the presence of the nitrating medium. In this manner the nitrocellulose product is obtained in a fluffy physical form, which possesses a normally soft surface and is more readily purified by washing than the relatively hard-surfaced nitrocellulose product obtained by batch nitration with said nitrating agent.

4. It provides a novel, economical method, involving use of a nitrate ion selective ion-exchange medium, for recovering nitric acid and magnesium nitrate values from aqueous wash liquors such as are obtained in the nitration of cellulose and other organic compounds e.g. glycerine, pentaerythritol, etc. with nitric acid-magnesium nitrate nitrating agent. These values are recovered as magnesium nitrate which can be recycled to the nitrating agent.

5. It provides a nitrocellulose product, which can be completely purified by washing with small amounts of water, rendering recovery of nitric acid and magnesium nitrate from wash liquors economically attractive.

We wish it to be understood that we do not desire to be limited to the exact detail of construction shown and described for obvious modification will occur to a person skilled in the art.

What is claimed is:

1. A continuous process for the manufacture of nitrocellulose which comprises
   a. passing cellulose and liquid nitrating agent consisting essentially of nitric acid, magnesium nitrate and water, and containing a ratio of from about 1.2 to 2.2 parts by weight of magnesium nitrate per part of water and sufficient nitric acid to yield nitrocellulose of at least about 11 percent by weight of nitrogen, through an attrition mill under conditions wherein the cellulose is abraded and nitrated,
   b. separating the nitrocellulose from the spent nitrating agent,
   c. concentrating the spent nitrating agent by distillation and recycling it to the system,
   d. purifying the nitrocellulose by washing it with water to remove nitric acid and magnesium nitrate impurities,
   e. contacting the wash liquors containing nitric acid and magnesium nitrate with an ion exchange system which removes the nitrate and magnesium ions from said liquors, f. recovering the nitrate and magnesium ions, g. converting said magnesium ions to magnesium nitrate, and *i* recycling the magnesium nitrate thus obtained to the system.

2. The process according to claim 1, wherein the reaction mixture from the attrition mill is conducted to an agitated vessel to complete the nitration.

3. The process according to claim 1, wherein the nitrocellulose separated from spent nitrating agent is washed with aqueous ammonia subsequent to washing with water and thereafter washed with water.

4. The process according to claim 1, wherein nitrocellulose fines are separated from the spent nitrating medium and aqueous wash liquors and recycled to the nitrocellulose product subjected to washing.

5. The process according to claim 1, wherein a. The wash liquors containing nitric acid and magnesium nitrate are contacted with a basic nitrate ion selective ion exchange medium capable of regeneration with aqueous ammonia, thereby removing the nitrate ions and forming magnesium hydroxide, b. The ion-exchange medium is thereafter contacted with aqueous ammonia to remove the nitrate ions as ammonium nitrate and regenerate the ion exchange medium, c. The aqueous ammonium nitrate and magnesium hydroxide thus obtained are mixed and heated to form magnesium nitrate and gaseous ammonia, d. The magnesium nitrate and ammonia thus obtained are recovered and recycled to the system.

6. The process according to claim 5, wherein the wash liquor contacted with the ion exchange medium contains from about 10 to 20 ppm $HNO_3$ and from about 100 to 200 ppm of $Mg(NO_3)_2$.

7. The process according to claim 1, wherein a. The wash liquors containing nitric acid and magnesium nitrate are contacted with an anionic ion exchange resin in bicarbonate form, which removes the nitrate ions and converts the magnesium ions into soluble magnesium bicarbonate, b. the anionic resin containing the nitrate ions is contacted with ammonium hydroxide which removes the nitrate ions and forms ammonium nitrate, c. the magnesium bicarbonate is contacted with a cationic ion exchange resin, which removes the magnesium ions and forms carbonic acid solution, d. the cationic ion exchange resin containing the magnesium ions is contacted with dilute nitric acid, which removes the magnesium ions and forms soluble magnesium nitrate, and e. the magnesium nitrate thus obtained is recycled to the system.

* * * * *